(12) United States Patent
Smith, III et al.

(10) Patent No.: US 7,976,075 B2
(45) Date of Patent: Jul. 12, 2011

(54) PROBE SEAL HAVING SPRING-ENERGIZED SEALING ELEMENTS FOR FEMALE HYDRAULIC COUPLING MEMBER

(75) Inventors: Robert E Smith, III, Missouri City, TX (US); F. Harold Hollister, Sugar Land, TX (US)

(73) Assignee: National Coupling Company, Inc., Stafford, TX (US)

( * ) Notice: Subject to any disclaimer, the term of this patent is extended or adjusted under 35 U.S.C. 154(b) by 177 days.

(21) Appl. No.: 12/414,833

(22) Filed: Mar. 31, 2009

(65) Prior Publication Data

US 2009/0255597 A1 Oct. 15, 2009

Related U.S. Application Data

(60) Provisional application No. 61/044,547, filed on Apr. 14, 2008.

(51) Int. Cl.
*F16L 21/02* (2006.01)

(52) U.S. Cl. .................................. 285/374; 277/618

(58) Field of Classification Search .................. 285/374, 285/110; 277/618, 394, 353
See application file for complete search history.

(56) References Cited

U.S. PATENT DOCUMENTS

| | | | | |
|---|---|---|---|---|
| 2,535,634 A | * | 12/1950 | Hubbard | 277/500 |
| 3,031,213 A | * | 4/1962 | Bruning et al. | 285/372 |
| 3,464,707 A | * | 9/1969 | Squinto et al. | 277/463 |
| 3,698,727 A | * | 10/1972 | Greenwald | 277/618 |
| 4,141,563 A | * | 2/1979 | Wu | 277/556 |
| 4,299,412 A | * | 11/1981 | Parmann | 285/110 |
| 4,441,723 A | * | 4/1984 | Greenwald | 277/618 |
| 4,593,914 A | * | 6/1986 | Johnson | 277/618 |
| 4,641,858 A | * | 2/1987 | Roux | 285/110 |
| 4,900,071 A | | 2/1990 | Smith, III | |
| 5,000,491 A | | 3/1991 | Bartholomew | |
| 5,052,439 A | | 10/1991 | Smith, III | |
| 5,160,122 A | * | 11/1992 | Balsells | 277/618 |
| 5,232,021 A | * | 8/1993 | Smith | 285/111 |
| 5,232,252 A | * | 8/1993 | Bartholomew | 285/108 |
| 5,339,861 A | * | 8/1994 | Smith, III | 137/614.04 |
| 5,893,391 A | | 4/1999 | Jenski, Jr. | |
| 6,056,291 A | * | 5/2000 | Inagaki et al. | 277/618 |
| 6,173,964 B1 | * | 1/2001 | Bell et al. | 277/584 |
| 6,179,002 B1 | | 1/2001 | Smith, III | |
| 6,209,879 B1 | * | 4/2001 | Mizunoya et al. | 277/394 |
| 6,357,751 B1 | * | 3/2002 | Rentschler | 277/353 |
| 6,513,812 B1 | * | 2/2003 | Yang et al. | 277/353 |
| 6,575,430 B1 | | 6/2003 | Smith, III | |
| 6,962,347 B2 | * | 11/2005 | Smith, III | 285/108 |
| 7,372,933 B2 | * | 5/2008 | Ohsono et al. | 277/618 |
| 7,575,256 B2 | * | 8/2009 | Smith, III | 285/374 |
| 2005/0029749 A1 | | 2/2005 | Smith, III | |

FOREIGN PATENT DOCUMENTS

GB 1551421 A 10/1976

* cited by examiner

*Primary Examiner* — David E Bochna
(74) *Attorney, Agent, or Firm* — Wong, Cabello, Lutsch, Rutherford & Brucculeri, L.L.P.

(57) ABSTRACT

A crown-type probe seal for a female hydraulic coupling member has one or more circumferential, spring-energized seals. One particular preferred seal comprises a closely-wound helical spring which imparts an inwardly-directed radial force to the crown seal. In certain embodiments, the helical spring is substantially encased in a polymer jacket. In yet other embodiments, a liner is interposed between the outer surface of the helical spring and the polymer jacket. An optional, axial extension on at least one end of the crown seal provides a bore liner for a female hydraulic coupling member in which the crown seal is installed.

20 Claims, 2 Drawing Sheets

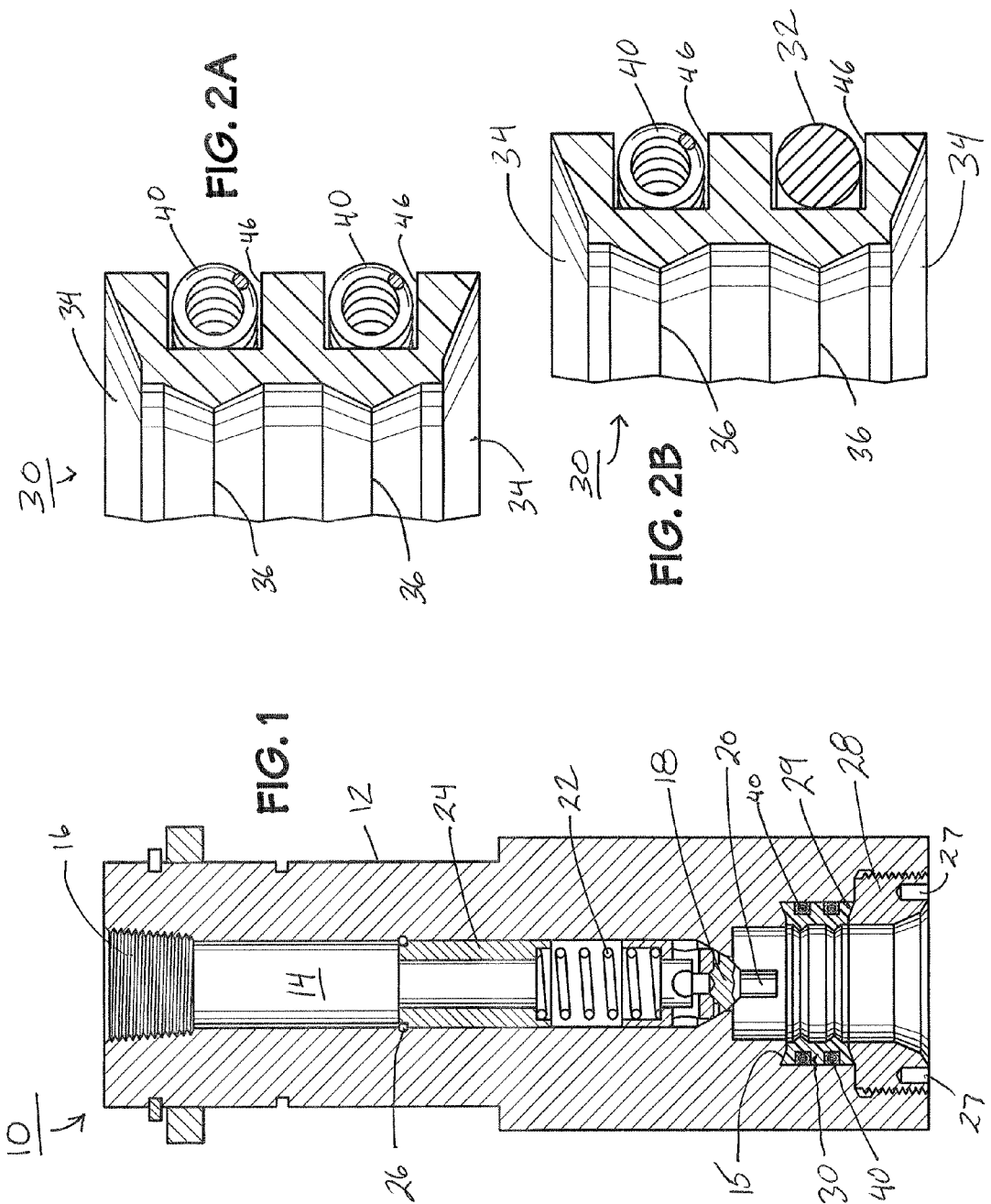

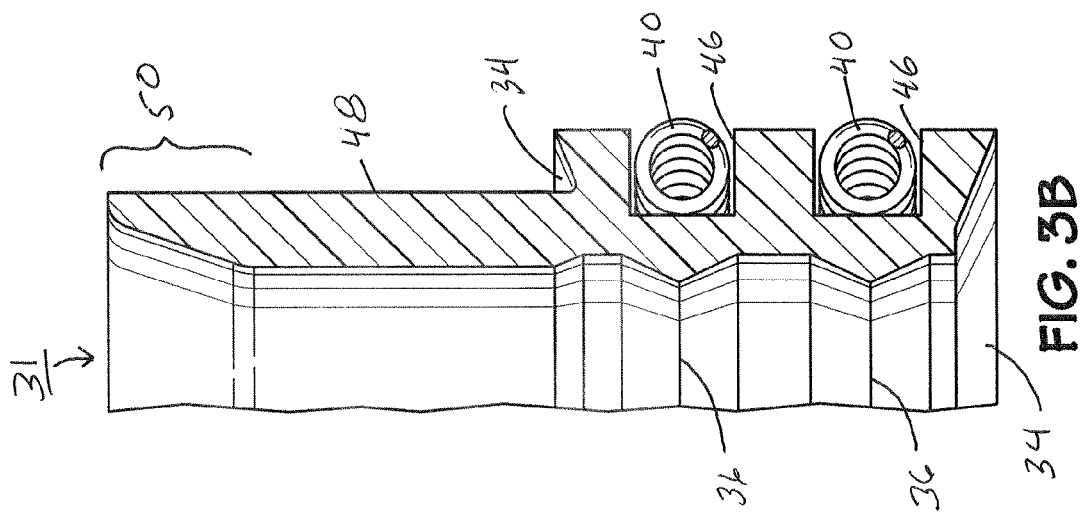
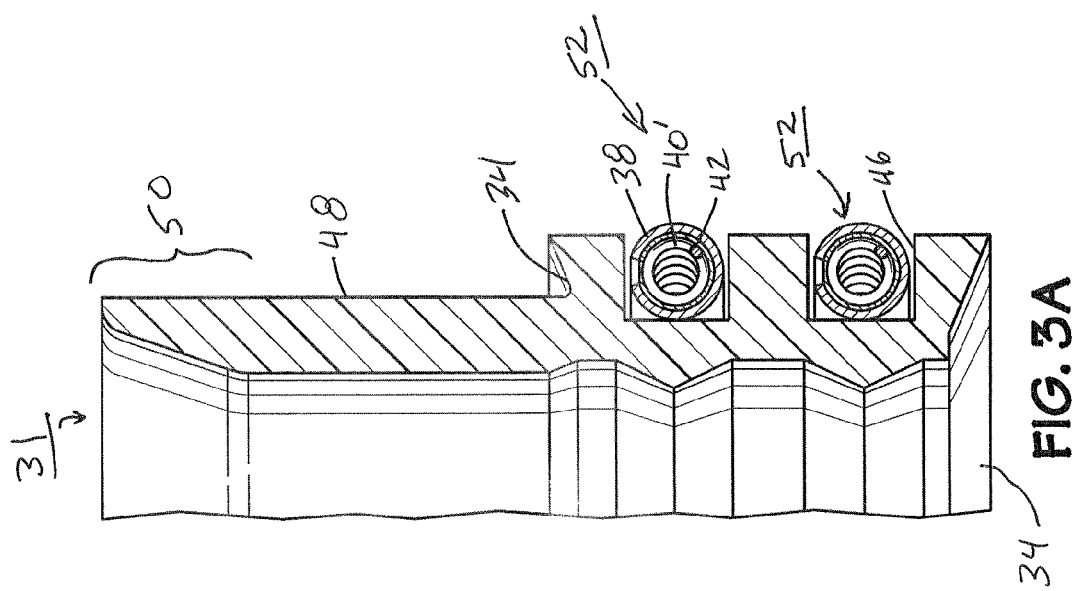

PROBE SEAL HAVING SPRING-ENERGIZED SEALING ELEMENTS FOR FEMALE HYDRAULIC COUPLING MEMBER

CROSS-REFERENCE TO RELATED APPLICATIONS

This Application Claims The Benefit Of U.S. Provisional Application Ser. No. 61/044,547 Filed Apr. 14, 2008.

STATEMENT REGARDING FEDERALLY SPONSORED RESEARCH OR DEVELOPMENT

Not Applicable

BACKGROUND OF THE INVENTION

1. Field of the Invention

This invention relates to hydraulic coupling members. More particularly, it relates to high-pressure, female coupling members for subsea use in oil and gas exploration and production applications.

2. Description of the Related Art Including Information Disclosed Under 37 CFR 1.97 and 1.98

A wide variety of hydraulic coupling members are known in the art. Typically, a coupling is comprised of two members—a male member having a generally cylindrical probe and a female member having a receiving chamber equipped with one or more seals for providing a fluid-tight radial seal with the outer surface of the probe element of the male member.

For high-temperature, high-pressure applications, a crown-type seal having a dovetail interference fit with a seal retainer or seal cartridge in a female coupling member has proven to be a particularly effective configuration.

U.S. Pat. No. 6,575,430 discloses an undersea hydraulic coupling member having a ring-shaped seal with multiple sealing surfaces extending radially inwardly therefrom. The multiple sealing surfaces help guide the probe of the male coupling member into the female member without the risk of drag or galling of the receiving chamber or metal seal retained therein. The seal has an interfit with reverse inclined shoulders in the female member to restrain the seal from moving radially inwardly due to vacuum or low pressure in the receiving chamber.

U.S. Pat. No. 6,179,002 describes an undersea hydraulic coupling with a pressure-energized dovetail seal. The seal has a pair of flexible sealing surfaces for sealing with the male and female coupling members, and a cavity therebetween that is exposed to fluid pressure in the coupling. The outer circumference of the seal has a dovetail interfit between inclined shoulders in the female member bore and on a seal retainer that holds the seal in the bore.

U.S. Pat. No. 5,052,439 and U.S. Pat. No. 4,900,071 describe an undersea hydraulic coupling which includes a male member and female member, and a two-piece retainer for restraining radial movement of a wedge-shaped annular seal into the central bore of the female member. The two-piece retainer includes a cylindrical retainer sleeve member slidably received within the female member bore, and a threaded retainer-locking member threadable to mating threads in the wall of the central bore. The retainer-locking member holds the retainer sleeve member in place within the female member bore. The annular seal is restrained from radial movement by a dovetail interfit with a mating shoulder on at least one of the retainer sleeve and the retainer-locking members.

U.S. Patent Publication No. 2005/0029749 describes an undersea hydraulic coupling member having a bore liner that protects the coupling members from galling during assembly or disassembly. The bore liner is removable from the bore of a female undersea hydraulic coupling member. The bore liner may be integral with a seal section that may seal with a male undersea hydraulic coupling member. The bore liner also may have an outer diameter configured to engage and interlock with the bore in which the bore liner is positioned.

BRIEF SUMMARY OF THE INVENTION

A crown-type probe seal for a female hydraulic coupling member has one or more circumferential spring-energized seals. One particular preferred seal comprises a closely-wound helical spring which imparts an inwardly-directed radial force to the crown seal.

BRIEF DESCRIPTION OF THE SEVERAL VIEWS OF THE DRAWING(S)

FIG. 1 is a cross-sectional view of female hydraulic coupling having a crown seal equipped with spring-energized, circumferential seals.

FIG. 2A is a cross-sectional view of a crown seal according to a first embodiment.

FIG. 2B is a cross-sectional view of a crown seal according to a second embodiment.

FIG. 3A is a cross-sectional view of a crown seal having a bore liner extension according to a first embodiment.

FIG. 3B is a cross-sectional view of a crown seal having a bore liner extension according to a second embodiment.

DETAILED DESCRIPTION OF THE INVENTION

The invention may best be understood by reference to particular embodiments. FIG. 1 shows a female hydraulic coupling member 10 comprising generally cylindrical body 12 having a central axial bore 14. One end of bore 14 has threaded portion 16 to facilitate connection to a fluid conduit (not shown). In yet other embodiments, threaded portion 16 is omitted and the connection to a fluid conduit is made by welding, brazing, swaging or other methods well known in the art.

Optional poppet valve 18 in bore 14 prevents the loss of hydraulic fluid when the coupling is decoupled. Poppet valve 18 is held in the closed position by spring 22 acting against spring seat 24 which is retained in the bore 14 by retainer clip 26. Poppet valve 18 is opened when valve actuator 20 contacts a similar actuator in the male coupling member.

Coupling 10 is equipped with crown seal 30 which is held in bore 14 by means of retainer nut 28. Bore 14 of female member body 12 may include angled shoulder 15. Retainer nut 28 may have an angled shoulder 29 which, together with angled shoulder 15, creates a dovetail interference fit with corresponding shoulders 34 (FIG. 2) on crown seal 30 so as to resist radial movement of crown seal 30 into bore 14.

Crown seal 30 provides a fluid-tight seal to the probe of a male member inserted into female member 10. In coupling members of the prior art, circumferential elastomeric O-ring seals have been used to provide a fluid-tight seal between body 12 of female member 10 and crown seal 30. In yet other prior art coupling members, crown seal 30 itself provides a seal to body 12 and no supplemental circumferential seal elements are employed. This design choice is often dictated by the physical properties of the material used to fabricate crown seal 30.

Certain polymer crown seals used in high temperature applications have been found to soften and lose some degree of sealing effectiveness. This is particularly the case when the crown seal comprises a thermoplastic material. The practice of the present invention provides increased radial pressure in an inward direction on sealing projections 36 by the action of helicoidally wound spring 40 thereby improving the seal performance of the coupling.

As mentioned above, certain types of crown seals in certain applications may benefit from being biased in an inward, radial direction. In the present invention, this bias is provided by means of a circumferential, closely-wound, helical spring. This arrangement is illustrated in greater detail in FIG. 2A. As in certain of the crown seals of the prior art, crown seal 30 has dovetail shoulders 34, sealing projections 36 and one or more circumferential grooves 46 on its outside diameter. In the illustrated embodiments, grooves 46 are rectangular in cross section. In yet other embodiments, grooves 46 have a rounded or semicircular bottom or inner surface to conform more closely to helical spring 40 or O-ring seal 32. As illustrated in FIGS. 1 and 2A, into one or more of grooves 46 are fitted circumferential helical springs 40 which may be sized to exert an inward, radial force thereby increasing the sealing effectiveness of sealing projections 36. In one preferred embodiment, spring 40 is a closely-wound, helical spring.

An alternative embodiment of crown seal 30 is shown in FIG. 2B. In this embodiment, circumferential seal 32 which may be an elastomeric O-ring is fitted into one of grooves 46. Circumferential seal 32 may increase the sealing effectiveness of crown seal 30 to body 12 of female coupling member 10.

Certain commercially-available seals are comprised of both a helical spring member and one or more jackets and/or liners surrounding the spring. One particular jacketed spring seal 52 which employs viscoplastic deformation of a metallic lining is the HELICOFLEX™ seal available from Garlock, Inc. (Palmyra, N.Y. 14522). The deformation is obtained by compressing a helicoidal spring within the seal.

A crown seal 31 having a bore liner extension 48 is shown in FIG. 3A equipped with jacketed spring seal 52. Bore liner 48 lines the bore of the receiving chamber of female coupling 10 thereby preventing metal-to-metal contact between body 12 and the probe of the male member. Without a bore liner, a misalignment of the female and male members during coupling can lead to galling of the metal surfaces if metal-to-metal contact occurs. Bore liner extension 48 may include beveled portion 50 for guiding the probe of the male member into the receiving chamber of the female member. As shown in FIG. 3A, jacketed spring seal 52 may comprise a HELICOFLEX seal—i.e., a seal comprised of jacket 38, helical spring 40' and optional liner 42. A gap in jacket 38 permits the insertion of spring 40.

As in the embodiments illustrated in FIGS. 2A and 2B, various combinations of spring-energized radial sealing members 52, helical springs 40 and O-rings 32 may be utilized in crown seal 31.

FIG. 3B illustrates a crown seal 31 with a bore liner extension 48 having helical springs 40 in circumferential grooves 46 to provide an inward, radial bias to sealing projections 36. This inward, radial bias may increase the sealing effectiveness of the crown seal 31 to the probe of a male member inserted in the female coupling member particularly under high temperature conditions which may soften the body of crown seal 31.

A seal according to the present invention may be fabricated using any suitable material. In certain embodiments, the seal may be molded using a natural or synthetic polymer. In other embodiments, the seal may be machined using an engineering plastic examples of which include polyetheretherketone (PEEK) and polytetrafluoroethylene (PTFE).

Although the invention has been described in detail with reference to certain preferred embodiments, variations and modifications exist within the scope and spirit of the invention as described and defined in the following claims.

What is claimed is:

1. A probe seal for a hydraulic coupling member, comprising:
   a ring-shaped body having an outer circumference and an inner circumference, the axial dimension of the ring-shaped body at the outer circumference being greater than the axial dimension of the ring-shaped body at the inner circumference, a first end surface disposed at a first acute angle to the longitudinal axis of the ring-shaped body and an opposing second end surface disposed at a second acute angle to the longitudinal axis such that the first angle and second angle are equal and opposite angles;
   at least one circumferential groove in the outer circumference of the ring-shaped body,
   at least one annular sealing projection radially extending from the inner circumference of the ring-shaped body said sealing projection being substantially radially aligned with the circumferential groove; and,
   a helically-wound spring positioned in at the least one groove, the spring sized and configured to impart an inward radial force on the ring-shaped body.

2. A probe seal as recited in claim 1 having a plurality of circumferential grooves and an equal plurality of sealing projections, each sealing projection being substantially radially aligned with a circumferential groove.

3. A probe seal as recited in claim 2 further comprising a helically-wound spring in each circumferential groove.

4. A probe seal as recited in claim 1 further comprising at least one O-ring seal positioned in a circumferential groove.

5. A probe seal as recited in claim 1 further comprising a polymer jacket substantially encasing the helically-wound spring.

6. A probe seal as recited in claim 5 further comprising a polymer liner interposed between the outer surface of the helically-wound spring and the jacket.

7. A probe seal as recited in claim 1 further comprising a sleeve-shaped polymer bore liner on at least one end of the ring-shaped body configured for preventing metal-to-metal contact between the internal surface of the bore of a female coupling member holding the probe seal and the probe section of a male hydraulic coupling member inserted in the bore, the bore liner having an internal diameter greater than the internal diameter of the annular sealing projection.

8. An female hydraulic coupling member, comprising:
   a substantially cylindrical body having a central axial bore having a plurality of sections of varying internal diameters with internal shoulders between the sections;
   a pair of reverse inclined shoulder surfaces in the central axial bore;
   a ring-shaped seal sized for insertion into a section of the central axial bore between the pair of reverse inclined shoulder surfaces, the seal having an outer circumference and an inner circumference, the axial dimension of the seal being greater at the outer circumference than the axial dimension of the seal at the inner circumference and one or more circumferential grooves in the outer circumference of the ring-shaped seal and a helically-wound spring positioned in at least one groove, the seal having at least one radial sealing surface extending inwardly from the inner circumference and radially aligned with at least one groove.

9. A female hydraulic coupling member as recited in claim 8 wherein the ring-shaped seal has a plurality of circumferential grooves and an equal plurality of sealing projections, each sealing projection being substantially radially aligned with a circumferential groove.

10. A female hydraulic coupling member as recited in claim 9 further comprising a helically-wound spring in each circumferential groove of the ring-shaped seal.

11. A female hydraulic coupling member as recited in claim 8 further comprising at least one O-ring seal positioned in a circumferential groove on the ring-shaped seal.

12. A female hydraulic coupling member as recited in claim 8 further comprising a polymer jacket substantially encasing the helically-wound spring.

13. A female hydraulic coupling member as recited in claim 12 further comprising a polymer liner interposed between the outer surface of the helically-wound spring and the jacket.

14. A female hydraulic coupling member as recited in claim 8 further comprising a sleeve-shaped polymer bore liner on at least one end of the ring-shaped body configured for preventing metal-to-metal contact between the internal surface of the bore of the female coupling member and the probe section of a male hydraulic coupling member inserted in the bore, the bore liner having an internal diameter greater than the internal diameter of the annular sealing projection on the ring-shaped seal.

15. A female hydraulic coupling member as recited in claim 14 wherein the bore liner is integral with the ring-shaped seal.

16. A female hydraulic coupling member as recited in claim 14 wherein the bore liner is comprised essentially of polyetheretherketone.

17. A female hydraulic coupling member as recited in claim 14 wherein the bore liner is comprised essentially of polytetrafluoroethylene.

18. A female hydraulic coupling member as recited in claim 8 wherein the bore liner comprises a beveled portion proximate one end thereof and having a progressively increasing internal diameter configured to guide the probe of a male member into sealing engagement with the ring-shaped seal.

19. A female hydraulic coupling member as recited in claim 8 wherein the ring-shaped seal is comprised essentially of polyetheretherketone.

20. A female hydraulic coupling member as recited in claim 8 wherein the ring-shaped seal is comprised essentially of polytetrafluoroethylene.

* * * * *